United States Patent

[11] 3,621,928

[72] Inventor Carleton W. Sprague
Albuquerque, N. Mex.
[21] Appl. No. 63,505
[22] Filed Aug. 13, 1970
[45] Patented Nov. 23, 1971
[73] Assignee Rolamite Incorporated
San Francisco, Calif.

[54] WEIGHING SCALES OF FORCE-BALANCING TYPE
11 Claims, 5 Drawing Figs.

[52] U.S. Cl. .................................................. 177/224, 177/255
[51] Int. Cl. ...................................................... G01g 1/02
[50] Field of Search ............................................ 177/216, 219, 220, 221, 224, 255

[56] References Cited
UNITED STATES PATENTS
638,596  12/1899  Reisert ..................... 177/216
1,661,291  3/1928  Joksch ...................... 177/221
FOREIGN PATENTS
104,545  5/1926  Austria ..................... 177/220
731,150  12/1942  Germany .................... 177/216

Primary Examiner—Richard B. Wilkinson
Assistant Examiner—George H. Miller, Jr.
Attorney—Burns, Doane, Benedict, Swecker & Mathis ABSTRACT: A weighing scale having a platform that moves relative to the base with a movable pointer indicating the weight of an object placed on the platform. A base member and a platform member have opposed cylindrical surfaces which are arranged in parallel relation and are spaced apart from each other by an interposed rolling member. A thin flexible band supports the base member and the platform member for vertical swinging movement relative to the base member. A movable roller is positioned between the opposed cylindrical surfaces and rolls along the surfaces in response to movement of the platform member relative to the base member. A counterweight or counterforce that is attached to the roller applies a countertorque that progressively increases the resistance to displacement of the platform member. A pointer or indicator which is proportionally driven for the torque applied to the roller indicates the weight of the object on the platform when the counterweight or counterforce is balanced. The indicator may be directly attached to the roller or may be driven by intermediate means (mechanical, electrical, hydraulic, pneumatic, etc.) by which the indicated position will be proportional to the applied weight.

PATENTED NOV 23 1971

3,621,928

INVENTOR
CARLETON W. SPRAGUE

BY Burns, Doane, Benedict,
Swecker & Mathis

ATTORNEYS

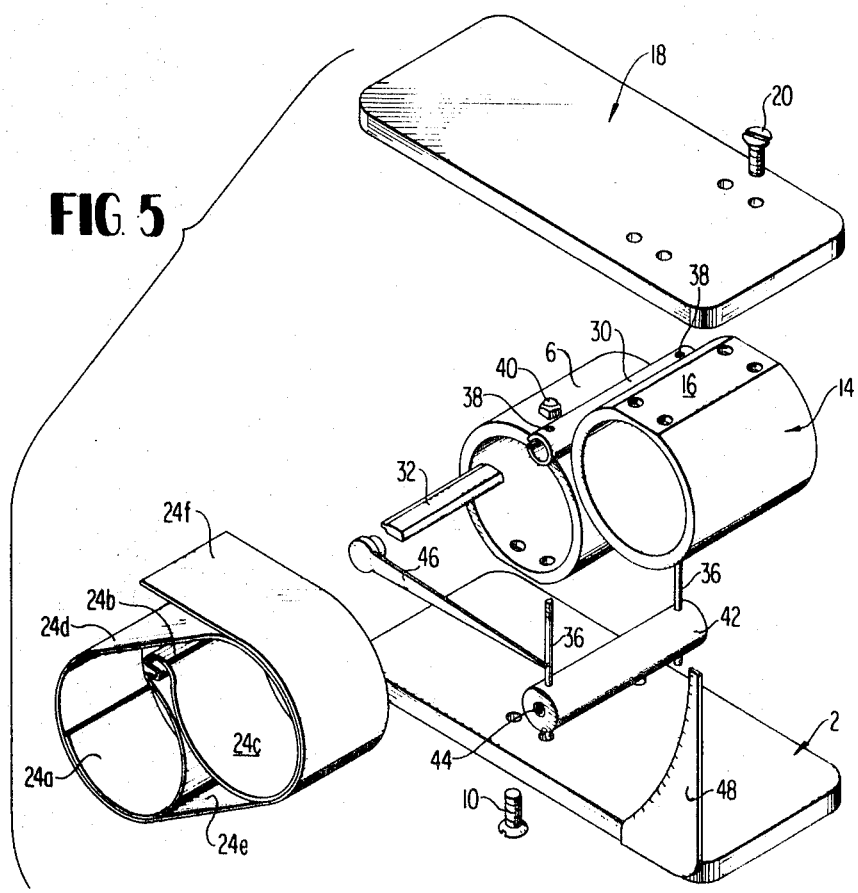

3,621,928

WEIGHING SCALES OF FORCE-BALANCING TYPE

BACKGROUND OF THE DISCLOSURE

This invention relates to weighing apparatus and more particularly to weighing scales of the force-balancing type.

It is desirable for scales to provide an accurate indication of weight regardless of the location of the object on the weighing platform. One conventional means for minimizing variation in weight measurement due to the position of the object on the platform is to mount the movable platform on a parallelogram structure, so that the platform remains substantially horizontal during deflection of the platform relative to the base. Typical parallelogram linkages require movable joints between the links. Friction between the elements in the joints resists movement of the links and causes wear at the joints. Friction in the linkages must be overcome before they begin to move and therefore frictional drag reduces the sensitivity of the scale and introduces hysteresis differences in the indicated weight. Also, friction in the movable joints contributes to wear which may cause the scale weight reading to change according to the position of the object in the platform.

SUMMARY OF THE INVENTION

In view of the disadvantages of these prior scales, it is an object of this invention to provide an improved weighing scale.

A further object of this invention is to provide a weighing scale that is accurate and yet inexpensive to manufacture.

A further object of this invention is to provide a weighing scale that is substantially free of wear and frictional resistance to movement.

Another object is to provide a weighing scale that is easily adjusted for different ranges of weights.

These objects are accomplished in accordance with a preferred embodiment of the invention by a weighing scale having a base member and a platform member, each having a cylindrical surface arranged in parallel, opposed relation and spaced apart from each other. The platform member is movable relative to the base member and is supported by thin flexible band portions that are parallel to each other and intersect the cylindrical surfaces on diametrically opposite sides of the respective members, so that the center of the cylindrical surface on the platform member moves along an arc about the center of the cylindrical surface on the base member and does not rotate relative to the base member. A roller is interposed between the cylindrical surfaces and has its central axis parallel to the central axes of the surfaces. A band portion is arranged in a loop bridging the gap between the opposed cylindrical surfaces and the roller is positioned within the loop, so that motion is transmitted between the cylindrical surfaces and the roller without slippage. An arm extends outwardly from the roller for supporting a counterweight which acts as a pendulum to resist movement of the roller. A pointer also extends outwardly from the roller to indicate the weight of an object placed on the platform member.

DETAILED DESCRIPTION OF THE DRAWINGS

This preferred embodiment is illustrated in the accompanying drawings in which:

FIG. 4 is a cross-sectional view of the scale along the line 4—4 in FIG. 3; and

FIG. 5 is an exploded perspective view of the components of the scale.

DETAILED DESCRIPTION OF PREFERRED EMBODIMENT

Figure 1:
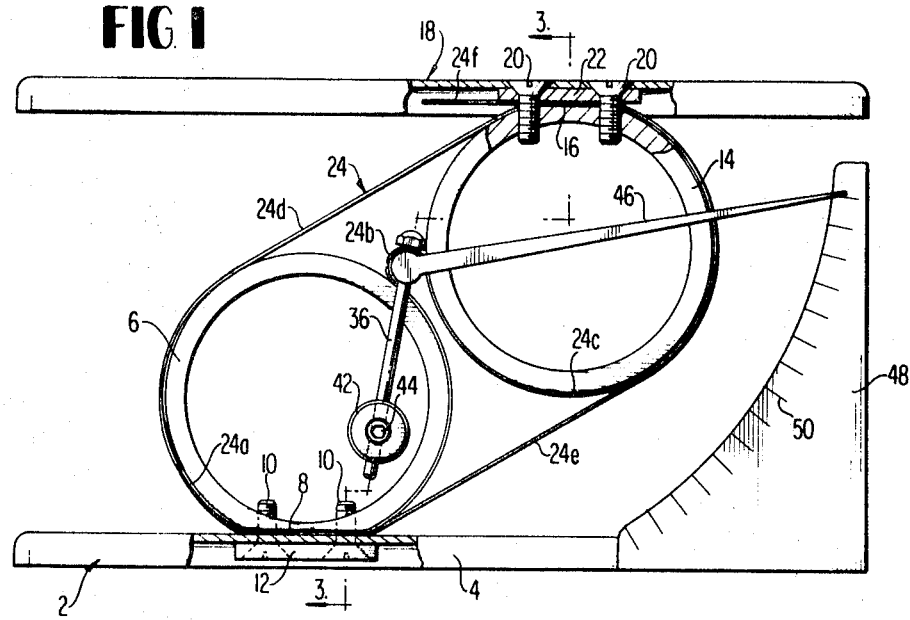
FIG. 1 is a side elevational view, partially in cross section, of a weighing scale in accordance with this invention.

In accordance with a preferred embodiment, the weighing scale of this invention includes a base 2 having downwardly projecting flanges 4 which provide a hollow recess within the base. A member 6 in the form of a hollow cylinder is secured on the base 2. The base cylinder 6 has a flat surface 8 that is clamped against the surface of the base 2 by screws 10 which cooperate with a clamping bar 12.

A member 14 in the form of a hollow cylinder possessing the same external diameter as the cylinder 6 is supported with its central axis parallel to the central axis of the base cylinder 6. The center distance between the cylinders is greater than the sum of the radii of the platform cylinder 14 and the base cylinder 6, so that there is a gap provided between the opposed surfaces of the cylinders. The platform cylinder 14 has a flat upper surface 16 and a weighing platform 18 is secured to the cylinder 14 by a plurality of screws 20 which extend through a clamping bar 22.

A thin flexible band 24 provides a movable support for the platform cylinder 14. The band 24 includes an end portion 24a which is clamped between the flat surface 8 on the base cylinder 6 and the surface of the base 2 and continues along the surface of the base cylinder 6. After passing through the gap between the opposed surfaces of the cylinders 6 and 14, the band is arranged in a loop 24b. A portion of the band 24c continues around the circumference of the cylinder 14 and is clamped between the flat surface 16 and the bar 22. The next portion of the band 24d extends tangentially from the surface of the cylinder 14 to the surface of the cylinder 6 and continues around the circumference of the cylinder 6 where it again is clamped between the flat surface 8 and the base 2. Another portion 24e of the band passes tangentially between the base cylinder 6 and the platform cylinder 14 and overlies the preceding band portion 24c as the band passes around the circumference of the cylinder 14 and is clamped between the flat surface 16 and the bar 22. The end 24f of the band remains free under the platform 18.

Figure 3:
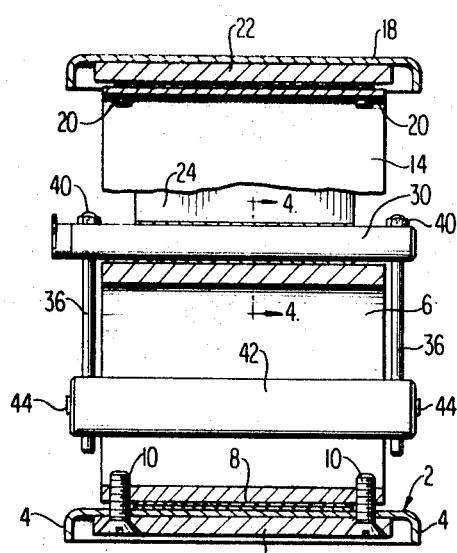
FIG. 3 is a cross-sectional view of the scale along the line 3—3 in FIG. 1.

As shown in FIGS. 3 and 5, the width of the band 24 is slightly less than the distance separating the screws 10 and 20. Since the screws do not engage the band 24, tension may be applied in the band by pulling on the end 24f before tightening the screws 10 and 20. When the screws are tightened, the band 24 is under tension and slippage between the band and the cylinders does not occur.

A roller 30 is positioned within the loop 24b in the band. The roller 30 has a diameter that is greater than the minimum width of the gap between the cylinders 6 and 14, so that it cannot pass through the gap. Preferably, the roller 30 is formed of hollow tubing (FIG. 4) and the band 24 is secured against displacement relative to the roller by a key 32 that is inserted in the roller 30. The band in the loop portion 24b passes through a longitudinal slot 34 in the roller 30 and is looped around the key 32 before passing out of the slot again, as shown in FIG. 4. In this arrangement, the key 32 wedges the band against the opposite sides of the slot 34 and positively prevents relative motion between the band and the roller 30.

Figure 2:
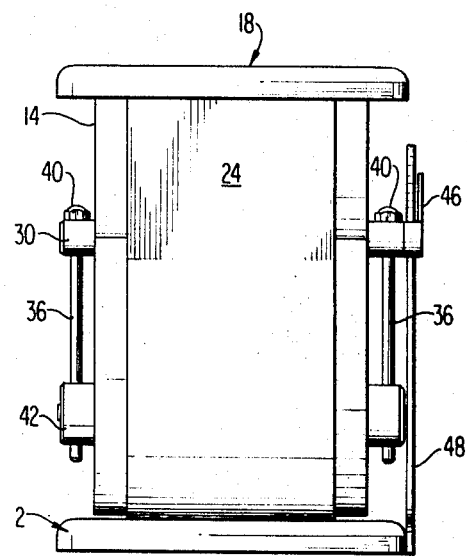
FIG. 2 is an end elevational view of the scale in FIG. 1.

The length of the key 32 corresponds to the width of the band 24 and, as shown in FIGS. 2 and 3, the ends of the roller extend beyond the ends of the cylinders 6 and 14. A balance arm 36 extends through aligned holes 38 at each end of the roller 30 and the arms 36 are secured in place by nuts 40 which are threaded on the arms 36.

A counterweight 42 is provided with holes at opposite ends through which the arms 36 extend. A setscrew 44 which is threaded in a socket in the end of the counterweight 42 engages the respective arms 36 to hold the counterweight 42 at a fixed distance from the central axis of the roller 30.

A pointer 46 has an integral cap that is frictionally secured in the end of the tubular roller 30. The pointer 46 may be adhesively bonded to prevent the pointer from turning relative to the roller. An upright plate 48 is mounted on the base 2. The plate 48 is provided with an arcuate scale 50 arranged along the path of the end of the pointer 46.

As shown in FIGS. 1 and 3, the counterweight 42 extends through the interior of the cylinder 6 and the interior wall of the cylinder serves as a stop limiting excessive counterclockwise rotation of the pointer beyond the lower end of the scale. The opposite side of the cylinder serves as a stop for the upper end of the scale as the counterweight 42 engages the wall of the cylinder. The counterweight 42 preferably is spaced from the interior wall of the cylinder 6 when the pointer is at the zero scale position where the tare weight of the platform and movable components are balanced by the counterweight 42.

The scale is shown in FIG. 1 in its normal position without any load or weight placed on the platform 18. When an object is placed on the platform for weighing, the weight of the object applies a downward force to the platform cylinder 14, but the presence of the roller 30 and the band portions 24d and 24e restrict the cylinder to movement along an arcuate path concentric with the cylinder 6. As the cylinder 14 moves downwardly, the upper band portion 24d is progressively wrapped on the external surface of the cylinder 6 while the opposite end of the band portion 24d is unwrapped from the surface of the cylinder 14. Similarly, one end of the band portion 24e is unwrapped from the surface of the band portion 24a that is supported by the cylinder 6, while the opposite end of the band portion 24e is wrapped on the surface of the band portion 24c that is supported by the cylinder 14. Since the ends of the band portions 24d and 24e are supported on cylindrical surfaces, the length of the band portions remain constant as the cylinder 14 moves downwardly. Also, the band portions 24d and 24e remain parallel to each other. Therefore, the band portions 24d and 24e maintain the cylinder 14 at a constant rotational position during vertical movement of the cylinder, thereby maintaining the platform 18 parallel to the base 2 as the platform moves downwardly and upwardly.

Although the cylinder 14 does not rotate relative to the base 2, there is relative motion between the opposed surfaces of the cylinders 6 and 14 which is transmitted to the roller 30 through the band at the loop portion 24b. Downward motion of the cylinder 14 causes the roller 30 to rotate in a clockwise direction as viewed in FIG. 1. As the roller 30 rotates, the arms 36 swing the counterweight 42 away from the interior wall of the cylinder 6. This motion increases the effective torque applied by the counterweight 42 through the arms 36 to the roller 30. The torque applied by the counterweight progressively increases as a function of the sine of the included angle between the arm 36 and a vertical line passing through the center of the roller 30.

The platform 18 continues to move downwardly under the weight of the object on the platform as the pointer 46 sweeps downwardly across the scale 50. The counterweight 42 applies progressively increasing torque on the roller 30 which is transmitted through the band 24 to the platform cylinder 14. When the torque that is exerted on the roller 30 by the counterweight 42 in a counterclockwise direction is equal to the clockwise torque applied through the band 24 by the cylinder 14, rotation of the roller 30 stops and the pointer 46 indicates the weight of the object on the platform 18. The scale 50 is calibrated to provide a direct indication of the weight of the object on the platform. When the object is removed, the counterweight swings downwardly, thereby returning the platform cylinder 14 to the position shown in FIG. 1 when the pointer 46 is at the lower end of the scale 50.

The band 24 is illustrated as a continuous band extending around the cylinders 6 and 14 and over the roller 30. This configuration allows the band to be assembled efficiently in the apparatus. Instead of a single band, separate bands can be used for portions 24d and 24e, provided they are secured to the surface of the perspective cylinders 6 and 14 at locations that would not interfere with the wrapping and unwrapping of the bands during weighing operations. Both cylinders 6 and 14 can be formed efficiently from tubular stock of the same size and are substantially interchangeable. However, the members 6 and 14 need not be entirely cylindrical. It is merely necessary for the opposed surfaces on which the roller 30 is supported and the exterior surfaces on which the band portions 24d and 24e are wrapped and unwrapped to be cylindrical. The remainder of the base member 6 and the platform member 14 may have any other suitable shape.

Instead of positioning the counterweight 42 within the hollow cylinder 6, the arms 36 may be extended to provide a greater distance between the counterweight and the roller 30. Also, heavier or lighter counterweights can be substituted for the counterweight 42. The counterweight 42 is merely exemplary of means of applying a torque on the roller 30 in opposition to the torque imposed by the cylinder 14. Examples of other means by which proportional countertorque may be applied to the roller 30 in lieu of the illustrated counterweights includes: (a) the application of torsional spring forces to the roller 30, (b) application of spring counterforces at any point along member 36, and (c) the use of a horizontal balance beam fixed to the roller 30 wherewith the applied and indicated countertorque would be proportional to the position of the movable counterweight. Means other than the pointer 46 and scale 50 can also be utilized for indicating relative motion between the roller 30 and the cylinder 14.

While this invention has been illustrated and described in a preferred embodiment, it is recognized that variations and changes may be made therein without departing from the invention as set forth in the claims.

What is claimed is:

1. Weighing apparatus comprising: base means having a cylindrical surface, load-bearing means having a cylindrical surface, supporting means maintaining said surfaces in parallel spaced relation for swinging movement of said load-bearing means relative to said base means without rotation of said surfaces relative to each other about their respective central axes, a thin flexible band extending along each of said surfaces and being arranged in a loop, a roller in said loop, said roller having a larger diameter than the minimum radial distance separating said surfaces, and resisting means for applying progressively increasing resistance to rotation of said roller in response to relative motion between said roller, whereby, the application of a load on said bearing means causes said roller to rotate to an extent that is proportional to said load.

2. The weighing apparatus according to claim 1 wherein said resisting means includes a counterweight spaced from said roller and arm means connecting said counterweight with said roller means.

3. Weighing apparatus according to claim 1 wherein said supporting means includes a first thin flexible support band extending tangentially between the cylindrical surface of the base means and the cylindrical surface of the load-bearing means and a second thin flexible support band extending tangentially between said base means surface and said load-bearing means surface on the diametrically opposite side of said cylindrical surfaces from said first band, and said supporting means including means for preventing longitudinal movement between said support bands and said cylindrical surfaces.

4. Weighing apparatus according to claim 3 wherein said bands comprising said supporting means and said band engaging said roller being integral with each other.

5. Weighing apparatus comprising a pair of support elements each having at least a semicylindrical surface, the central axes of said surfaces being spaced apart laterally and said surfaces being in opposed relation to each other, flexible band means extending between said elements, said band means including a pair of band lengths on opposite sides of a plane intersecting said central axes, said band lengths being superimposed on said surfaces, means preventing longitudinal slippage between said band lengths and said surfaces, a roller interposed between said surfaces and having its central axis parallel to the central axes of said surfaces, means for transmitting rotary motion between said roller and said surfaces, and means for resisting rotation of said roller in proportion to relative motion between said surfaces, whereby said roller counterbalances a force applied by a load on said support elements.

6. Weighing apparatus according to claim 5 wherein said cylindrical surfaces of said support elements have substantially the same diameter.

7. Weighing apparatus according to claim 5 including a thin flexible band extending along said roller and along the adjacent surfaces of said support elements, said band being arranged in a loop with said roller being positioned within said loop, whereby said band transmits motion between said surfaces and said roller without slippage.

8. Weighing apparatus according to claim 5 wherein said resisting means includes a counterweight spaced from said roller and arm means connecting said counterweight with said roller.

9. Weighing apparatus according to claim 5 including a base on one of said support elements and a platform on the other of said elements, said platform being substantially parallel to said base throughout the range of measurement by the apparatus.

10. Weighing apparatus according to claim 5 including indicating means on said roller responsive to motion of said roller.

11. Weighing apparatus according to claim 10 wherein said indicating means includes pointer means on said roller extending radially from the central axis of the roller, and said apparatus includes scale means cooperating with said pointer means to indicate angular rotation of said roller, whereby the pointer means indicates weight measured by said apparatus.

* * * * *